(No Model.)

L. RASTETTER & C. SIEBOLD.
SEAT ATTACHMENT FOR BICYCLES.

No. 460,031. Patented Sept. 22, 1891.

WITNESSES:
Donn Twitchell
C. Sedgwick

INVENTORS
L. Rastetter
C. Siebold
BY Munn & Co.
ATTORNEY.

UNITED STATES PATENT OFFICE.

LOUIS RASTETTER AND CRIST SIEBOLD, OF FORT WAYNE, INDIANA.

SEAT ATTACHMENT FOR BICYCLES.

SPECIFICATION forming part of Letters Patent No. 460,031, dated September 22, 1891.

Application filed June 23, 1891. Serial No. 397,208. (No model.)

*To all whom it may concern:*

Be it known that we, LOUIS RASTETTER and CRIST SIEBOLD, both of Fort Wayne, in the county of Allen and State of Indiana, have invented new and Improved Seat Attachments for Bicycles, of which the following is a full, clear, and exact description.

Our invention relates to seat attachments for bicycles; and the object of our invention is to produce an extra seat and attachments therefor which may be easily and quickly secured to or removed from an ordinary bicycle, which is adapted to hold a child in such a manner that it cannot fall out and that it will not unbalance the machine, and which may be adjusted to suit children of different sizes.

To this end our invention consists in certain features of construction and combinations of parts, which will be hereinafter described and claimed.

Reference is to be had to the accompanying drawings, forming a part of this specification, in which similar figures of reference indicate corresponding parts in both views.

Figure 1:
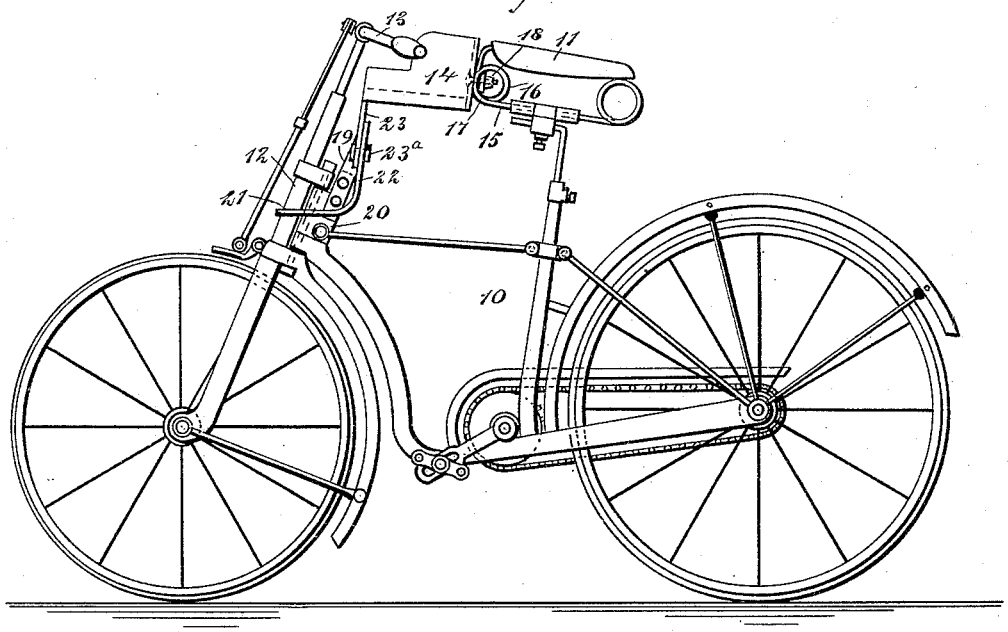
Figure 2:
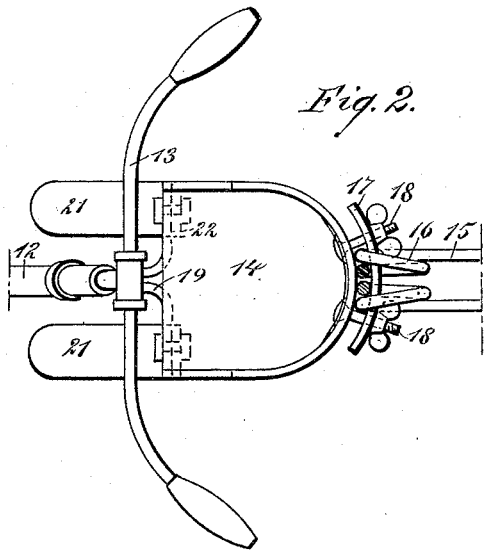

Figure 1 is a side elevation of a Safety bicycle provided with our improved seat; and Fig. 2 is a broken enlarged plan, partly in section, of the seat and its supports.

The seat may be secured to any common form of bicycle, and in the drawings the bicycle 10 is a Safety bicycle of the usual form, having the ordinary seat 11 and the usual steering-fork 12, which is provided at the top with a handle-bar 13. These parts are of the usual construction and form no part of our invention.

The extra seat 14, which is used in connection with the bicycle, is of a size to hold a small child, and is provided with a suitable back and sides. In fact, any desired form of seat may be used. The seat is supported at the back by the spring 15 of the main seat 11, a cleat 17 being passed through the front coil 16 of the spring 15, and this cleat is secured to the back of the seat 14 by means of bolts 18. Braces 19 extend downward and forward from the lower front portion of the seat 14, and these braces at the lower ends are bolted to a support 20, which is secured to the steering-fork and the main frame of the bicycle. The seat 14 is also provided with foot-rests 21, which extend in a nearly horizontal position on each side of the fork 12, and the rear portions of the foot-rests are bent upward, as shown at 22, and are clamped to depending hangers 23 on the seat 14 by means of bolts $23^a$, and the foot-rests are made adjustable in relation to the hangers 23, so that they may be made to suit children of different sizes. This may be accomplished by providing the hangers or the foot-rests with a series of holes or by slotting the hangers or foot-rests vertically. This arrangement has not been shown in detail, as it is a common thing to secure pieces of metal together in this manner.

When the seat 14 is used, the child is placed in it, and it will be seen that the child will have a foot on each side of the fork 12, and the handle-bar 13 will extend around in front of the seat, so as to form a secure guard and prevent the child from falling out. When the child is not to ride, the seat 14 may be easily removed from the bicycle, and the bicycle may then be used in the ordinary way.

Having thus described our invention, we claim as new and desire to secure by Letters Patent—

1. The combination, with a bicycle, of a supplementary seat arranged between the main seat and the handle-bar, the seat having its rear end secured to the spring of the main seat and having its front end supported from the main frame of the bicycle, substantially as described.

2. In a bicycle, the combination, with the steering-fork and the spring supporting the main seat, of an auxiliary seat, a cleat passed through the front coil of the spring supporting the main seat and secured to the auxiliary seat, and braces extending downwardly from the front portion of the auxiliary seat and secured to the fork, substantially as described.

3. An auxiliary seat for bicycles, consisting of a seat having adjustable foot-rests and provided with downwardly-projecting bars at its front, provided with means for securing them to the bicycle-frame, an apertured cleat, and bolts for connecting the cleat to the seat, substantially as herein shown and described.

LOUIS RASTETTER.
CRIST SIEBOLD.

Witnesses:
ULRICH HOTZ,
P. J. FALLON.